United States Patent [19]

Pedersen et al.

[11] 4,219,577
[45] Aug. 26, 1980

[54] PROCESS FOR THE PHYSICAL DISCOLORATION OF ANIMAL BLOOD

[75] Inventors: Jørgen W. Pedersen; Thorkild Lausen, both of Roskilde, Denmark

[73] Assignee: Nutridan Engineering A/S, Herlev, Denmark

[21] Appl. No.: 12,965

[22] Filed: Feb. 21, 1979

[30] Foreign Application Priority Data

Feb. 22, 1978 [DE] Fed. Rep. of Germany ....... 2807554
Mar. 8, 1978 [DK] Denmark ................................ 963/78

[51] Int. Cl.² ............................................. A23L 1/27
[52] U.S. Cl. ................................... 426/264; 426/266; 426/647
[58] Field of Search ............... 426/647, 264, 253, 256, 426/519, 520, 601, 266; 99/453; 424/101; 260/112 B; 422/44

[56] References Cited

U.S. PATENT DOCUMENTS

| | | | |
|---|---|---|---|
| 2,466,710 | 4/1949 | Keil et al. | 260/112 B |
| 3,123,593 | 3/1964 | Allan et al. | 426/647 |
| 4,007,284 | 2/1977 | Goryaev et al. | 426/647 |

*Primary Examiner*—S. Leon Bashore
*Assistant Examiner*—Michael L. Goldman
*Attorney, Agent, or Firm*—Edward F. Levy

[57] ABSTRACT

A process for the discoloration of animal blood in which whole blood or red blood corpuscles separated from whole blood by centrifugal action is carried in a fat milieu to which milk or vegetable protein is added and mixed. The mixture is then subjected to a considerable drop in pressure resulting in a reaction in which the red blood corpuscles are covered by a protein/fat film and thereby discolored. The drop in pressure is preferably in the order of 200–300 atmospheres and may take place in a homogenizer. The mixture of blood, fat, water and protein is preferably heated to a temperature in the range of 30°–70° before being fed to the homogenizer.

19 Claims, 1 Drawing Figure

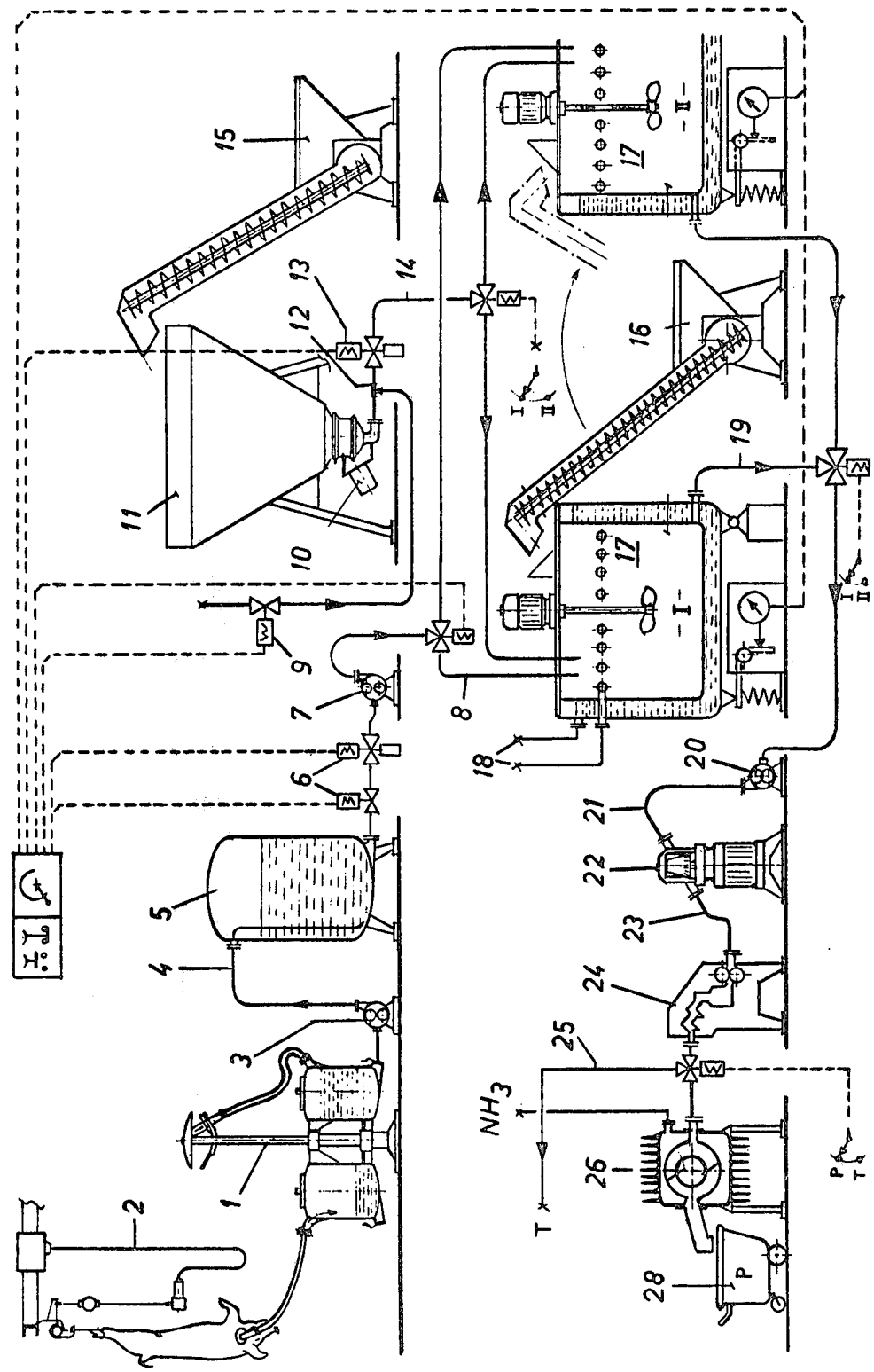

PROCESS FOR THE PHYSICAL DISCOLORATION OF ANIMAL BLOOD

The present invention covers a procedure for physical discoloration of blood by fine-emulsification in a fat milieu.

The use of blood from slaughtered animals for human consumption only takes place to a very small extent although the protein content of the blood is very high. The limited use of blood in the food industry is particularly due to the taste and the dark color. Even a small quantity of blood will result in end products of a dark, almost black color. The dark color is due to the hemoglobin content of the blood.

Various methods to discolor blood are known, which methods are based on the use of chemical substances in the form of strong oxidants and solvents, e.g. hydrogen peroxide and acetone. These chemical methods are rather complicated and do not produce satisfactory results.

Dr. techn. prof. Ju. Zajas and L. Zyrina (Research Institute for the Meat Industry of USSR) as well as dr. techn. prof. A. Sokolov (Technological Institute for the Meat and Milk Industry of Moscow) have recently developed a method of discoloring blood through fine-emulsification in a protein/fat milieu by using milk or vegetable proteins. The discoloration is accounted for by means of the redistribution of the fat, protein, and blood corpuscles taking place during the emulsifying process, i.e. the blood corpuscles are blanketed in a film of water and fat. The color of this homogeneous and stable dispersion of milk protein, fat, water, and blood protein is pink. The yielded emulsion is used as an admixture to sausages. The emulsification takes place by means of an ultrasonic plant comprising a poly-cleaved hydrodynamic vibrator built-in into a resonator. The plant further comprises a mixing tank with mixer and heating unit, from which tank the mixture is pumped through a filter to the ultrasonic unit and from this unit the emulsion is led to a cooling device. Melted lard, unprocessed blood, milk or dry vegetable protein, and water are filled into the mixing tank from where the mixture is by means of a pump led to the ultrasonic plant. The emulsion is exposed to repeated treatments until the required degree of dispersion and stability is obtained. The emulsion is thereafter cooled in the cooling device. The fluid pressure is at arrival in the ultrasonic plant of the size 11-13 atmosphere. The mixture used comprises 45% lard, 20% unprocessed blood, 28% water, and 7% milk or vegetable protein. Last-mentioned protein is according to weight percentage whereas the three others are according to volume percentage.

The purpose of the present invention is to provide a process for discoloring blood of the kind mentioned in the introduction, however, a more simple and less expensive procedure with better results.

It has unexpectedly resulted that an emulsion of blood and fat when passing through narrow slits and subjected to a considerable drop of pressure is discolored to a very high degree. The effect is specially dramatic when small quantities of milk proteins, such as e.g. sodium caseinate, or of vegetable proteins, such as e.g. soya protein isolates, have been added to the emulsion. The effect differs pointedly from the discoloration obtained by processing the emulsion in a colloid mill. The reaction can also be effected with centrifugally separated red blood corpuscles instead of whole blood, however, only after addition of protein as described above.

The results is according to the invention obtained most expediently by using a drop of pressure of the size 200-300 atmosphere. The pressure drop used is usually of approx. 250 atmosphere which proves to give a satisfactory result. This drop of pressure can e.g. be obtained by using a homogenizer of the type generally used in the dairy industry.

It turns out that a better degree of discoloration can be obtained by heating the mixture of blood, fat, and water led to the homogenizer to a temperature in the range of 30°-70° C. which seems to be the temperature by which the maximum degree of discoloration is obtained.

The procedure according to the invention is further characterized in that the mixture of blood, fat, and water is preprocessed in an emulsifier before being led to the homogenizer. In the emulsifier the blood is discolored to a small extent, however, this is unable to give the blood the required discoloring degree. The emulsifier is, however, operating as a sort of screen enabling the homogenizer to more easily process the mixture. The emulsifier mainly used is of the type which breaks the mixture to small globules.

The procedure according to the invention is further characterized in that fat, water, and perhaps other additives, such as e.g. protein, are mixed in a mixing tank and not until the fat melting is finished added to the blood. This procedure gives a rather homogeneous mixture before it is led to the homogenizer possibly via an emulsifier.

The fat melting is most expediently performed by heating in a boiler with heating jacket or by direct steam injection. The measuring of the quantity of fat is in the most simple way made by using a mixing tank equipped with weighing cells.

To obtain the best possible mixture from the beginning, the mixing tank mainly used is equipped with a stirring device. If protein, e.g. in the form of milk or vegetable protein, is added this is most expediently done in the mixing tank in the hot water. The addition of protein mainly takes place through a vibrator dosage.

A specially simple and exact dosage of the quantity of water is performed by means of a flowmeter.

The process according to the invention is further characterized in that the blood is not led to the mixing tank until the temperature therein has fallen to approx. 50° C. after fat melting has been completed. The temperature of the mixture is thereafter kept at a temperature of approx. 50° C. The quantity of blood as well as the quantity of water is mainly dosed by means of a flowmeter. To obtain a rational and quick procedure two mixing tanks are used, one of these supplying the homogenizer while the other is under preparation of the mixture.

To prevent a high bacteria count in the emulsion, as this has had a high temperature during the discoloring process, a cooling hereof is performed immediately upon passage of the mixture through the homogenizer. For the cooling there is preferably used a pressure cooler with scraper.

Compared to the technique with ultrasonic treatment so far known, the procedure according to the invention permits production of blood emulsions with a considerably higher content of blood. Zajas, Zyrina, and Sokolov thus indicate that the maximum concentration of blood which can be added to the emulsion must not exceed 25%. With our technique have been produced emulsions with more than 30% blood and of a color and protein/fat composition corresponding to ordinary meat. The emulsions while principally suited as replacement for meat when producing sausages and delicatessen products, can, however, also be used for thickening of sauces and the like instead of eggs, and in salads as well as other foodstuffs where used with expediency.

The invention is below explained in greater detail with reference to the drawing showing a plant for performance of the process according to the invention.

The blood is drained from the carcasses by means of blood collecting equipment (1) comprising equipment consisting of blood tanks and sticking knives suspended in a carrousel. The blood collecting equipment further comprises cleaning and sterilizing equipment for cleaning and sterilization of the blood knives and the blood tanks. The carcasses carried onto the slaughterline are divided up into series of e.g. 10 pcs. and the blood is collected in the same tank. The animals are by means of an electrical marking equipment (2) provided with a brand. The animals in the same series are branded with the same mark and the tank used is marked in accordance herewith. When all the carcasses in the same series have been approved, the blood is likewise approved, and then pumped from the blood collecting equipment by means of a pump (3) in the pipeline (4) to a collecting tank (5). If just one of the animals in a series is not approved by the veterinary inspection, the blood is condemned for human consumption. From the blood collecting tank (5) a pipeline (8) is led to the mixing tanks (17). In the pipeline (8) is inserted a flowmeter (6) with a solenoid valve and a pump (7) for pumping of the blood from the collecting tank (5) to the mixing tanks (17). The quantity of blood is dosed by means of the flowmeter (6).

Water and protein can be added to the mixing tanks (17) through the pipeline (12) and (14). The pipe (12) is connected to the network for hot or cold water. The protein is supplied to a silo (11) by means of a conveyor (15). From the silo (11) a supply of protein is fed to the pipeline (12) which is equipped with a solenoid valve for controlling the quantity of water to the protein supply. The quantity of protein to be dissolved in the water is decided through a vibrator dosage and the quantity of water is measured by means of a flowmeter (13).

In the present example of execution there is used lard in the form of block fat, abdominal strips or lard which is led to the mixing tanks (17) by means of a conveyor (16). The lard is measured by weight and for this purpose the mixing tanks are equipped with weighing cells.

The mixing tanks (17) are equipped with a jacket for water and steam supply and are further equipped with a melting plate and stirring device.

At the same time or after the supply of fat is fed to the mixing tanks (17), through the pipeline (12) and (14) there is led water and from the silo (11) protein to the mixing tanks (17). The quantity of protein to be dissolved in the water is decided by the vibrator dosage (10) and the quantity of water by means of the flowmeter (13). Blood is not added to the mixture until later. The fat melting takes place through direct steam injection and possible filling with 82° C. hot water with dissolved protein. In the heating jacket of the mixing tanks (17) water of a temperature of 50° C. is circulating. When the fat is melted and the temperature of the mixture has fallen to 50° C., the pump (7) for blood supply is activated. The quantity of blood added is decided by means of the flowmeter (6). By keeping a temperature of 50° C. in the mixture a separation of fat and water is prevented. The finished mixture is now by the pump (20) pumped into the pipelines (19) and (21) to the emulsifier (22) in which the mixture is preprocessed and obtains a certain degree of discoloration. The emulsifier further operates as a sort of screen and prepares the mixture for the homogenizer (24). From the emulsifier the mixture is now in the pipeline (23) led to the homogenizer (24) where the proper discoloration takes place. To obtain a low bacteria count the emulsification is cooled in a pressure cooler (26) immediately after having left the homogenizer.

The entire process can be controlled via an electrical panel and process control panel, from where the weighing cells can be regulated to carry out a weight registration of the quantity of fat in the mixing tanks (17). The flowmeters with presetting of quantity and supply velocity for water with protein and blood can likewise be controlled from this panel. Registration of temperature and adjustment of steam, water, and cooling temperature can be carried out via the panel, too, just as registration of the pistols being used in the electrical branding equipment can be made. Further there is a control of solenoid valves and start/stop buttons for all pumps and electromotors.

EXAMPLE 1

An emulsion consisting of 2.5 lit water, 2 lit blood, 1 kg lard, 1 kg caseinate, 0.36 kg nitrite salt, and 40 g sodium ascorbinate was produced. At a temperature of 50° C. the constituents were emulsified in the emulsifier (22) and thereafter led through the homogenizer at a pressure of 250 atmosphere. Thereby a light emulsion of creamish consistency was produced. This emulsion was used for producing a charge of Wiener sausages (I). The recipe of the sausage forcemeat was: 6 kg head meat, 4 kg emulsion, 3.6 kg jaw pieces, 4.5 kg ice water, 0.8 kg milk powder, 0.4 kg potato flour, 0.2 kg Purina 500E, 0.2 kg Purina 50A, 0.07 kg nitrite salt, 0.08 kg sodium polyphosphate, 0.1 kg spice mixture, 0.05 kg monosodium glutamate, 0.015 kg Maggi meat aroma, 0.005 kg sodium ascorbinate. The production of the forcemeat was made in a 60 lit Strømmen quick-mincer with 3 knives. Head meat, salt, and polyphosphate were filled into the bowl. The quick-mincer was started at half speed. After 5 turns Purina 50A and Purina 500E were added together with approx. 0.8 lit water. Thereafter the mincer was turned at full speed. After 100 turns the emulsion was added. After 200 turns potato flour, milk powder, and the remaining ice water were added. After 250 turns jaw pieces were added. After 300 turns spices were added, and after 350 turns the mincer was stopped. Temperature of the forcemeat 12° C. The forcemeat was thereafter stuffed into lamb casings, calibre 18–20 mm. The sausages were dried for 20 min. at 70° C., smoked for 30 min. at 70° C., boiled for 8 min. at 80° C., and cooled for 6 min.

Further, a charge of sausages (II) was produced according to the same procedure with the exception that the emulsion was not led through the homogenizer before being used in the production of the forcemeat. Yield measurings showed that the shrinkage of charge I and II was 9.11% and 8.53%, respectively. Taste judging of the sausages gave the following results with a marking scale from 1 (unacceptable) to 10 (excellent) having been used:

| Charge | Colour | Odour | Taste | Consistency | General Impression |
|--------|--------|-------|-------|-------------|--------------------|
| I | 8 | 8 | 8 | 8 | 8 |
| II | 2 | 2 | 2 | 8 | 2 |

As will be seen, the use of emulsions having been processed in a homogenizer results in an improvement of quality which is so considerable that the quality of the sausages fully corresponds to the use of pure meat instead of the emulsion.

EXAMPLE 2

An emulsion consisting of 1.2 lit water, 1.2 lit centrifuged-off blood corpuscules, 2 kg suet, 0.5 kg caseinate, 0.36 kg nitrite salt, and 40 g sodium ascorbinate was produced. At a temperature of 50° C. the constituents were emulsified through the emulsifier (22) and were thereafter led through the homogenizer at a pressure of 300 atmosphere. The colour of this emulsion was light reddish and the consistency creamish. The emulsion was used for production of a charge (I) of Wiener sausages exactly as in the example I. Further a charge (II) of sausages was produced according to the same procedure with the exception that the emulsion was not led through the homogenizer. Yield measurings showed that the shrinkage of charge I and II was 8.90% and 8.35%, respectively. Taste judging of the sausages showed that charge I corresponded very closely to sausages produced with pure meat instead of emulsions while the character of charge II was somewhat like blood sausages.

We claim:

1. A process for the discoloration of blood through reaction in a fat milieu, comprising the steps of preparing a mixture of melted fat, protein, water and blood, and subjecting said mixture to a considerable drop of pressure sufficient to cause the blood's red corpuscles to be covered by a protein/fat film and thereby faded.

2. A process for discoloration of red blood corpuscules separated from whole blood by centrifugal action, through reaction in a fat milieu, comprising the steps of
   preparing a mixture of melted fat, water, protein and red blood corpuscules, and
   subjecting said mixture to a considerable drop in pressure sufficient to cause the red blood corpuscules to be covered by a protein/fat film and thereby faded.

3. A process according to claims 1 or 2 in which said drop in pressure is in the range of 200 to 300 atmospheres.

4. A process according to claims 1 or 2 in which said drop of pressure is provided in a homogenizer.

5. A process according to claim 4 in which said mixture is subjected to a pressure drop of approximately 250 atmospheres.

6. A process according to claim 4 in which said mixture is heated to a temperature in the range of 30°–70° C. before being led to said homogenizer.

7. A process according to claim 4 in which said mixture is heated to a temperature of approximately 50° C. before being led to the homogenizer.

8. A process according to claim 1 or 2 which includes the additional step of emulsifying said mixture, to pre-process the latter, before the mixture is subjected to said drop of pressure.

9. A process according to claim 1 in which the preparation of said mixture includes the steps of mixing fat with water in a mixing tank, melting the fat, and thereafter adding and mixing in the blood to be discolored, to provide the finished mixture.

10. A process according to claim 9 in which protein, in the form of milk or vegetable protein, is mixed with the melted fat and water before adding the blood.

11. A process according to claim 10 in which the amount of said protein added to the mixture is controlled by a vibrator dosage.

12. A process according to claim 9 in which the quantity of water added to the mixture is measured by means of a flowmeter.

13. A process according to claim 9 which includes the step of allowing the mixture of melted fat and water to cool to a temperature of approximately 50° C. before adding the blood to the mixture.

14. A process according to claim 13 in which the mixture of melted fat, water and blood, is kept at a temperature of approximately 50° C. until being subjected to said pressure drop.

15. A process according to claim 14 in which said mixing tank has a heating jacket for circulation of hot water at a temperature of approximately 50° C.

16. A process according to claim 9 in which the quantity of blood added to the mixture is controlled by a flowmeter.

17. A process according to claim 9 in which said drop of pressure is provided in a homogenizer and in which the mixture is prepared in two mixing tanks each connected to said homogenizer and each operating alternately to feed the mixture to said homogenizer while the other mixing tank is preparing additional mixture.

18. A process according to claim 4 which includes the additional step of cooling the mixture immediately upon its leaving the homogenizer.

19. A process according to claim 18 in which the cooling step is performed in a pressure cooler.

* * * * *